US010190544B2

(12) United States Patent
Sommerhoff et al.

(10) Patent No.: US 10,190,544 B2
(45) Date of Patent: *Jan. 29, 2019

(54) SUPERCHARGER WITH EXHAUST GAS RECIRCULATION

(71) Applicant: Ford Global Technologies, LLC, Dearborn, MI (US)

(72) Inventors: Franz Arnd Sommerhoff, Aachen (DE); Joerg Kemmerling, Monschau (DE); Helmut Matthias Kindl, Aachen (DE); Vanco Smiljanovski, Bedburg (DE); Hanno Friederichs, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/221,252

(22) Filed: Jul. 27, 2016

(65) Prior Publication Data
US 2017/0030308 A1     Feb. 2, 2017

(30) Foreign Application Priority Data
Jul. 29, 2015    (DE) .................. 10 2015 214 324

(51) Int. Cl.
*F02B 33/44*     (2006.01)
*F02M 25/07*     (2006.01)
(Continued)

(52) U.S. Cl.
CPC ............ *F02M 26/70* (2016.02); *F02B 37/00* (2013.01); *F02D 9/101* (2013.01); *F02D 9/103* (2013.01);
(Continued)

(58) Field of Classification Search
CPC ........ F02M 26/70; F02M 26/06; F02M 26/21; F02M 26/71; F02M 35/10157; F02B 37/00; F02D 41/0077; Y02T 10/144
(Continued)

(56) References Cited

U.S. PATENT DOCUMENTS 3,270,775 A * 9/1966 Alderson .............. F16K 11/052
                                           137/625.44
4,222,356 A * 9/1980 Ueda ...................... F02M 26/70
                                           123/568.18
(Continued)

FOREIGN PATENT DOCUMENTS

DE           2901703 A1    3/1980
DE    102005052496 A1    5/2007
(Continued)

*Primary Examiner* — Thai Ba Trieu
(74) *Attorney, Agent, or Firm* — Julia Voutyras; McCoy Russell LLP

(57) ABSTRACT

An engine, methods and systems are provided for supercharging charge air for internal combustion engines. The engine having an intake, and a blower with at least one impeller in the intake mounted on a rotatable shaft. An EGR line opens into the intake system upstream of the at least one impeller to form a junction point. A flap, pivotable about an axis running transversely with respect to the intake air flow, has: a first position which blocks the intake by way of a front side, and which opens up the EGR line; and a second position to cover the EGR line and open intake system wherein the flap is not planar, and has, at least on the front side thereof, at least one deformation as an unevenness.

22 Claims, 3 Drawing Sheets

(51) Int. Cl.
*F16K 1/16* (2006.01)
*F16K 1/44* (2006.01)
*F02M 26/70* (2016.01)
*F02M 26/06* (2016.01)
*F02B 37/00* (2006.01)
*F02M 35/10* (2006.01)
*F02D 9/10* (2006.01)
*F02M 26/21* (2016.01)
*F02M 26/71* (2016.01)
*F02D 41/00* (2006.01)

(52) U.S. Cl.
CPC ............ *F02M 26/06* (2016.02); *F02M 26/21* (2016.02); *F02M 26/71* (2016.02); *F02M 35/10157* (2013.01); *F02D 41/0077* (2013.01); *Y02T 10/144* (2013.01)

(58) Field of Classification Search
USPC ......... 60/605.2; 123/568.12, 568.18, 568.19, 123/568.21; 137/625.44; 251/298
See application file for complete search history.

(56) References Cited

U.S. PATENT DOCUMENTS

| | | | | |
|---|---|---|---|---|
| 4,480,815 A * | 11/1984 | Kreij | ................ | F16K 1/226 251/298 |
| 5,705,250 A | 1/1998 | Hudson, Jr. | | |
| 5,803,112 A * | 9/1998 | Andersson | ............. | E03C 1/108 137/217 |
| 5,908,047 A * | 6/1999 | Nakamura | ............ | F16K 11/052 137/625.44 |
| 6,418,719 B2 | 7/2002 | Terry et al. | | |
| 7,017,560 B2 * | 3/2006 | Eriksson | ............... | F16K 11/165 123/568.12 |
| 7,219,661 B2 * | 5/2007 | Aberle | ................ | F02B 29/0418 123/568.12 |
| 7,591,131 B2 * | 9/2009 | Easley, Jr. | .............. | F02M 26/06 60/605.2 |
| 7,600,380 B2 * | 10/2009 | Grissom | ............... | F02B 37/007 137/625.44 |
| 7,617,678 B2 * | 11/2009 | Joergl | .................... | F02M 26/06 60/605.2 |
| 8,162,004 B2 * | 4/2012 | Albert | ................. | F16K 11/0525 137/625.44 |
| 9,709,178 B2 * | 7/2017 | Dowd | .................. | F16K 11/0525 |
| 2005/0263732 A1 * | 12/2005 | Kurian | ............... | F16K 27/0272 251/298 |
| 2011/0061380 A1 * | 3/2011 | Leroux | .................. | F02M 26/06 60/605.2 |
| 2013/0291536 A1 * | 11/2013 | Koch | .................... | F02M 26/06 60/599 |
| 2015/0027420 A1 | 1/2015 | Antoni et al. | | |
| 2015/0198119 A1 * | 7/2015 | Kuske | .................... | F02M 26/06 60/605.2 |
| 2017/0145967 A1 * | 5/2017 | Penzato | ................. | F02M 26/06 |
| 2018/0058340 A1 * | 3/2018 | Kuske | ................. | F02D 41/0007 |
| 2018/0058341 A1 * | 3/2018 | Kuske | ................. | F02D 9/1015 |

FOREIGN PATENT DOCUMENTS

| | | | |
|---|---|---|---|
| DE | 102012101851 A1 | 9/2013 | |
| DE | 102012103311 A1 | 10/2013 | |
| FR | 2893363 A1 * | 5/2007 | ............. F02M 26/26 |
| JP | 07224633 A * | 8/1995 | ............. F01N 3/031 |
| JP | 10026235 A * | 1/1998 | |
| JP | 11294267 A * | 10/1999 | |
| WO | WO 2016032775 A1 * | 3/2016 | ............. F02M 26/05 |

* cited by examiner

SUPERCHARGER WITH EXHAUST GAS RECIRCULATION

CROSS-REFERENCE TO RELATED APPLICATION

This application claims priority to German Patent Application No. 102015214324.4, filed Jul. 29, 2015, the entire contents of which are hereby incorporated by reference for all purposes.

FIELD

The present application relates to a supercharged internal combustion engine, systems, and methods including a flap at a junction of an exhaust-gas discharge line and an intake line.

BACKGROUND/SUMMARY

In recent years, there has been a trend in development towards supercharged engines, wherein the economic significance of the engines for the automobile industry continues to steadily increase.

Supercharging is primarily a method for increasing performance in which the air required for the combustion process in the engine is compressed, as a result of which a greater air mass can be fed to each cylinder in each working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption.

Supercharging consequently assists in the constant efforts in the development of internal combustion engines to minimize fuel consumption, that is to say to improve the efficiency of the internal combustion engine.

For supercharging, use is often made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor conveys and compresses the charge air fed to it, as a result of which supercharging of the cylinders is obtained. A charge-air cooler is advantageously provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. Compression by cooling takes place.

The advantage of an exhaust-gas turbocharger in relation to a mechanical supercharger consists in that an exhaust-gas turbocharger utilizes the exhaust-gas energy of the hot exhaust gases, whereas a mechanical supercharger draws the energy required for driving it directly or indirectly from the internal combustion engine. In general, a mechanical connection is required for the transmission of power between the supercharger and the internal combustion engine.

The advantage of a mechanical supercharger in relation to an exhaust-gas turbocharger consists in that the mechanical supercharger generates, and makes available, the required charge pressure at all times, specifically regardless of the operating state of the internal combustion engine, in particular regardless of the present rotational speed of the crankshaft. This applies in particular to a mechanical supercharger which can be driven by way of an electric machine.

In the prior art, it is specifically the case that difficulties are encountered in achieving an increase in power in all engine speed ranges by means of exhaust-gas turbocharging. A relatively severe torque drop is observed in the event of a certain engine speed being undershot. The torque drop is understandable if one takes into consideration that the charge pressure ratio is dependent on the turbine pressure ratio or the turbine power. If the engine speed is reduced, this leads to a smaller exhaust-gas mass flow and therefore to a lower turbine pressure ratio or lower turbine power. Consequently, toward lower engine speeds, the charge pressure ratio likewise decreases. This equates to a torque drop.

Attempts have been made to mitigate the problems with reduced torque in lower engine speed conditions. For example U.S. Pat. No. 6,418,719 discloses a system and method for using an engine's exhaust back pressure to control a variable geometry turbocharger. The control system determines a desired exhaust back pressure based on engine speed and engine load, and actuates turbocharger nozzles to achieve the desired exhaust back pressure.

However, the inventors herein have recognized potential issues with such systems. For example, the system appears to add a considerable level of complexity, and cost, to the engine. Embodiments in accordance with the present disclosure provide a more straightforward approach to mitigate potential torque drop during low engine speed operation.

Embodiments in accordance with the present disclosure may be directed to a supercharged internal combustion engine that may include an intake system for the supply of a charge-air flow, an exhaust-gas discharge system for the discharge of exhaust gas, and at least one blower arranged in the intake system. The blower may be equipped with at least one impeller, which may be mounted in a housing, on a rotatable shaft. The internal combustion engine may also include an exhaust-gas recirculation (EGR) arrangement comprising a recirculation line which branches off from the exhaust-gas discharge system and which opens into the intake system upstream of the at least one impeller so as to form a junction point, the recirculation line branching off upstream of a turbine arranged in the exhaust-gas discharge system. The supercharged internal combustion engine may also include a flap which may be delimited circumferentially by an edge and which may be arranged in the intake system at the junction point and which may be pivotable about an axis running transversely with respect to the fresh-air flow, in such a way that the flap, in a first end position, by way of a front side, blocks the intake system and opens up the recirculation line, and in a second end position, by way of a rear side, covers the recirculation line and opens up the intake system. Wherein the flap may not be planar, and may have, at least in the front side, at least one flow modification element, or feature, for example a deformation as, for example, an unevenness.

The invention also relates to a method for operating an internal combustion engine of the type, in which the at least one blower has an inlet region which runs, and is formed, coaxially with respect to the shaft of the at least one impeller.

An internal combustion engine of the type described herein may be used as a motor vehicle drive unit. Within the context of the present disclosure, the expression "internal combustion engine" may encompass diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

The internal combustion engine may have a blower for supercharging purposes, wherein, in the context of the present disclosure, the expression "blower" may encompass both mechanical superchargers and compressors of exhaust-gas turbochargers.

It is a further basic aim to reduce pollutant emissions. Supercharging can likewise be expedient in solving this problem. With targeted configuration of the supercharging, it is possible specifically to obtain advantages with regard to efficiency and with regard to exhaust-gas emissions. To adhere to future limit values for pollutant emissions, however, further engine-internal measures are necessary in addition to the supercharging arrangement.

For example, exhaust-gas recirculation serves for reducing the untreated nitrogen oxide emissions. Here, the recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air. Any oxygen or air recirculated via the exhaust-gas recirculation arrangement can be taken into consideration.

The internal combustion engine according to the invention which may be supercharged by way of a blower may also equipped with an exhaust-gas recirculation (EGR) arrangement, wherein the recirculation line, which branches off from the exhaust-gas discharge system, opens into the intake system, so as to form a junction point, upstream of the blower, as is generally the case in a low-pressure EGR arrangement, in which exhaust gas that has already passed through a turbine arranged in the exhaust-gas discharge system is recirculated to the inlet side. For this purpose, the low-pressure EGR arrangement comprises a recirculation line which branches off from the exhaust-gas discharge system downstream of the turbine and issues into the intake system upstream of the compressor.

The internal combustion engine to which the present disclosure relates may furthermore have a flap which may be arranged in the intake system at the junction point. The flap may serve for the adjustment of the fresh-air flow rate supplied via the intake system, and at the same time for the metering of the exhaust-gas flow rate recirculated via the exhaust-gas recirculation arrangement, and may be pivotable about an axis running transversely with respect to the fresh-air flow, in such a way that, in a first end position, the front side of the flap may block the intake system, and at the same time the recirculation line is opened up, and in a second end position, the rear side of the flap may cover the recirculation line, and at the same time the intake system may be opened up. In the above context, both "blocking" and "covering" do not imperatively also mean "closing".

The axis, running transversely with respect to the fresh-air flow, about which the flap is pivotable need not be a physical axle. Rather, the axis may be a virtual axis, the position of which in relation to the rest of the intake system may furthermore exhibit a certain play, wherein the mounting or fastening may be realized in some other way.

It is basically sought to shift the surge limit of the blower as far as possible toward smaller charge-air flows, in particular in the case of exhaust-gas turbocharging. It is then possible, even in the presence of small compressor flows, to realize high charge pressure ratios, whereby the torque characteristic in the low engine speed range may be considerably improved. The flow approaching the blower is of particular significance with regard to a shift of the surge limit.

Various embodiments may provide a supercharged internal combustion engine by means of which the disadvantages known from the prior art may be overcome and smaller charge-air flows can be realized and compressed.

Embodiments may provide a method for operating an internal combustion engine of the type, in which the at least one blower has an inlet region which runs, and may be formed, coaxially with respect to the shaft of the at least one impeller.

The flap of the internal combustion engine according to the present disclosure may not be, as in the case of a conventional internal combustion engine, of planar and plate-like form, that is to say similar to a plate, with a width and height that amount to several times the thickness. Rather, the flap according to the present disclosure may have a visibly three-dimensional form and may thus has a certain depth, wherein the depth, or the unevenness, may result from at least one deformation on the front side of the flap.

For the formation of a flap according to the present disclosure, use may even be made of an originally planar flap which may be deformed for the purposes of introducing at least one deformation. The approach may also be advantageous with regard to the retrofitting of an internal combustion engine with a flap according to the present disclosure.

Tests have shown that the deformation of the flap may have, or may give rise to, expedient effects in terms of flow. A substantially axial charge-air flow or fresh-air flow may have a speed component transverse with respect to the shaft of the blower, that is to say a swirl, forcibly imparted to it by way of the flap. In this way, the surge limit of the blower can be shifted toward smaller charge-air flows, whereby relatively high charge-pressure ratios are achieved even in the case of small charge-air flows. The torque characteristic of the supercharged internal combustion engine may be noticeably improved in the lower engine speed range.

In this way, the first object on which the present disclosure is directed may be achieved. That is to say a supercharged internal combustion engine may be provided by means of which the disadvantages known from the prior art are overcome and smaller charge-air flows can be realized and compressed.

According to the present disclosure, the recirculation line may branch off from the exhaust-gas discharge system upstream of the turbine, similarly to a high-pressure EGR arrangement.

If exhaust gas extracted from the exhaust-gas discharge system upstream of the turbine is introduced into the intake system, this duly has the effect that the exhaust-gas flow introduced into the turbine is, in the case of exhaust-gas recirculation, reduced by the recirculated exhaust-gas flow rate. On the other hand, this approach may increase the pressure gradient between the outlet side and the inlet side, as a driving force for the recirculation of preferably cooled exhaust gas. This may offer advantages in particular in the case of high recirculation rates, which may provide a greater pressure gradient.

Since the recirculated exhaust gas is introduced, and mixed with fresh air, upstream of the blower, the recirculated exhaust gas may be subjected to exhaust-gas aftertreatment, in particular in a particle filter. There is then minimal risk of depositions in the blower which may change the geometry of the blower, in particular the flow cross sections, and thereby impair the efficiency of the blower.

Embodiments of the internal combustion engine of the present disclosure may be advantageous in which the axis may be arranged close to an edge section of the flap. In this embodiment, the flap may be laterally mounted and pivotable similarly to a door, specifically at one of its edges. This may distinguish the flap according to the present disclosure from centrally mounted shut-off elements or flaps, such as for example a butterfly valve.

Embodiments of the internal combustion engine may be advantageous in which the axis may be arranged close to a wall section of the intake system. The intake system generally performs, with regard to the flap, the function of a frame, that is to say borders the flap. In this respect, an embodiment in which the axis is arranged close to an edge section of the flap may be, generally, also an embodiment in which the axis is arranged close to a wall section of the intake system. The major advantage of both embodiments may include, in the second end position, the flap may be positioned close to the wall, such that a completely free passage for the fresh air may be realized.

Embodiments of the internal combustion engine may be advantageous in which the at least one deformation of the flap comprises at least one kink. Embodiments of the internal combustion engine may also, or instead, be advantageous in particular in which the at least one deformation of the flap comprises at least one bulge. A bulge, that is to say a rounded flap surface or flap front side, may be aerodynamically more expedient, and may conduct the fresh air in the direction of the impeller with little turbulence. By contrast, a kink, that is to say a sharp rim, may give rise to pronounced turbulence in the fresh-air flow that is drawn in. This may be regarded as disadvantageous owing to the pressure loss in the fresh air that is drawn in, though may also have advantages with regard to thorough mixing of the fresh air with the recirculated exhaust gas. In some cases, the at least one bulge may be convex. In some cases, the at least one bulge may be concave.

In the two above embodiments, the front side of the flap may serve as a reference plane, that is to say the statement as to whether, in an individual case, a bulge that is provided is arched inward or outward may be made proceeding from the front side, wherein, a virtually planar front side of the flap may be taken as a starting point.

Embodiments of the internal combustion engine may be advantageous in which the at least one deformation on the front side of the flap may face toward and may oppose the fresh-air flow at least in the first end position of the flap. Then, the at least one deformation may project, as it were, into the fresh-air flow.

Embodiments of the internal combustion engine may be advantageous in which the at least one deformation may encompass an edge region of the flap situated opposite the axis, or the at least one deformation may be delimited on the edge region of the flap. This is that edge region of the flap over which the fresh-air flow passes, and across which the flow is conducted in the direction of the impeller. In this respect, the section in particular may be suitable for a guiding function or for introducing a swirl into a substantially axial fresh-air flow. The edge of the region may also be referred to as separation rim of the flap.

In this context, embodiments of the internal combustion engine may be advantageous in which the at least one deformation encompasses an edge corner region on one side of the flap, or the at least one deformation is delimited on the edge corner region of the flap. A corner of the flap according to the invention may be generally a rounded corner. Deforming the flap only on one side may make it easier for a speed component transverse with respect to the shaft of the impeller to be introduced, that is to say for a swirl to be introduced, into a substantially axial fresh-air flow. At least one deformation of the flap in the edge corner region may yield a helically twisted form.

Embodiments of the internal combustion engine may be advantageous in which at least one exhaust-gas turbocharger may be provided which comprises the turbine arranged in the exhaust-gas discharge system and a compressor arranged in the intake system. With regard to the above embodiment, reference is made to the statements already made in conjunction with the exhaust-gas turbocharging arrangement, for example to the highlighted advantages. In this context, embodiments of the internal combustion engine may also be advantageous in which the at least one blower is the compressor of the at least one exhaust-gas turbocharger.

Embodiments of the internal combustion engine may be advantageous in which the at least one blower may be a radial blower. This embodiment may permit dense packaging with regard to the supercharging arrangement. The blower housing can be configured as a spiral or worm housing. In the case of an exhaust-gas turbocharger, the diversion of the charge-air flow in the compressor of the exhaust-gas turbocharger can advantageously be utilized for conducting the compressed charge air on the shortest path from the outlet side, on which the turbine of the exhaust-gas turbocharger is commonly arranged, to the inlet side.

In this context, embodiments of the internal combustion engine may be advantageous in which the turbine is a radial turbine. This embodiment permits, for example, dense packaging of the exhaust-gas turbocharger and thus of the supercharging arrangement as a whole, if the turbine is a turbine of an exhaust-gas turbocharger.

By contrast to turbines, compressors or blowers may be defined in terms of their exit flow. A radial blower or radial compressor may thus be a blower or compressor whose flow exiting the rotor blades runs substantially radially. In the context of the present disclosure, "substantially radially" may mean that the speed component in the radial direction is greater than the axial speed component.

Embodiments of the internal combustion engine may however also be advantageous in which the blower may be of axial type of construction. The flow exiting the impeller blades of an axial blower may run substantially axially.

Embodiments of the internal combustion engine may be advantageous in which the at least one blower has an inlet region which runs coaxially with respect to the shaft of the at least one impeller and which may be designed such that the flow of charge air approaching the at least one impeller runs substantially axially.

In the case of an axial inflow to the blower or compressor, a diversion or change in direction of the charge-air flow in the intake system upstream of the at least one impeller is often omitted, whereby unnecessary pressure losses in the charge-air flow owing to flow diversion are avoided, and the pressure of the charge air at the inlet into the blower is increased. The absence of a change in direction may also reduce the contact of the exhaust gas and/or charge air with the internal wall of the intake system and/or with the internal wall of the blower housing, and thus reduces the heat transfer and the formation of condensate.

Embodiments of the internal combustion engine may be advantageous in which a shut-off element is arranged in the intake system upstream of the junction point. The shut-off element may serve, at the inlet side, for reducing the pressure in the intake system, and can thus be conducive to increasing the pressure gradient between the exhaust-gas discharge system and the intake system. In this connection, embodiments of the internal combustion engine may be advantageous in which the shut-off element is a pivotable or rotatable flap.

Embodiments of the internal combustion engine may be advantageous in which the recirculation line is equipped with a valve which comprises an axially displaceable valve body which is connected, and thereby mechanically coupled, to the flap, a pivoting of the flap causing a displacement of the valve body. Consequently, the flap can serve as an actuation device for the valve, and/or the valve can serve as an actuation device for the flap.

All variants of the above embodiments may have in common the fact that the flap serves for the setting of the air flow rate supplied via the intake system, and not for the metering of the recirculated exhaust-gas flow rate. The latter is effected by way of the valve, which may be fitted in the recirculation line and serves as an EGR valve.

Embodiments of the internal combustion engine may be advantageous in which the junction point is formed and arranged in the vicinity of, at a distance A from, the at least one impeller. An arrangement of the junction point close to the blower may shorten the path for the hot recirculated exhaust gas from the point at which it is introduced into the intake system to the at least one impeller, such that the time available for the formation of condensate droplets in the free charge-air flow may be reduced. A formation of condensate droplets is thus counteracted in this way. Furthermore, a swirl introduced into the flow using the flap remains effective, that is to say is still pronounced, at the point at which the charge air enters the impeller. This is also intended and therefore advantageous.

In this connection, embodiments of the internal combustion engine may be advantageous in which, for the spacing $\Delta$, the following applies: $\Delta \leq 2.0 D_V$ or $\Delta \leq 1.5 D_V$, where $D_V$ denotes the diameter of the at least one impeller. Embodiments may be advantageous in which, for the spacing $\Delta$, the following applies: $\Delta \leq 1.0 D_V$, preferably $\Delta \leq 0.75 D_V$.

The second sub-object on which the present disclosure is based, for example, of specifying a method for operating a supercharged internal combustion engine of an above type, in which the at least one blower may have an inlet region which runs, and may be formed, coaxially with respect to the shaft of the at least one impeller, may be achieved by way of a method in which a substantially axial fresh-air flow has a speed component transverse with respect to the shaft of the at least one impeller forcibly imparted to it by way of the flap.

That which has already been stated with regard to the internal combustion engine according to the invention also applies to the method according to the invention, for which reason reference is generally made at this juncture to the statements made above with regard to the supercharged internal combustion engine. The different internal combustion engines require, in part, different method variants.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
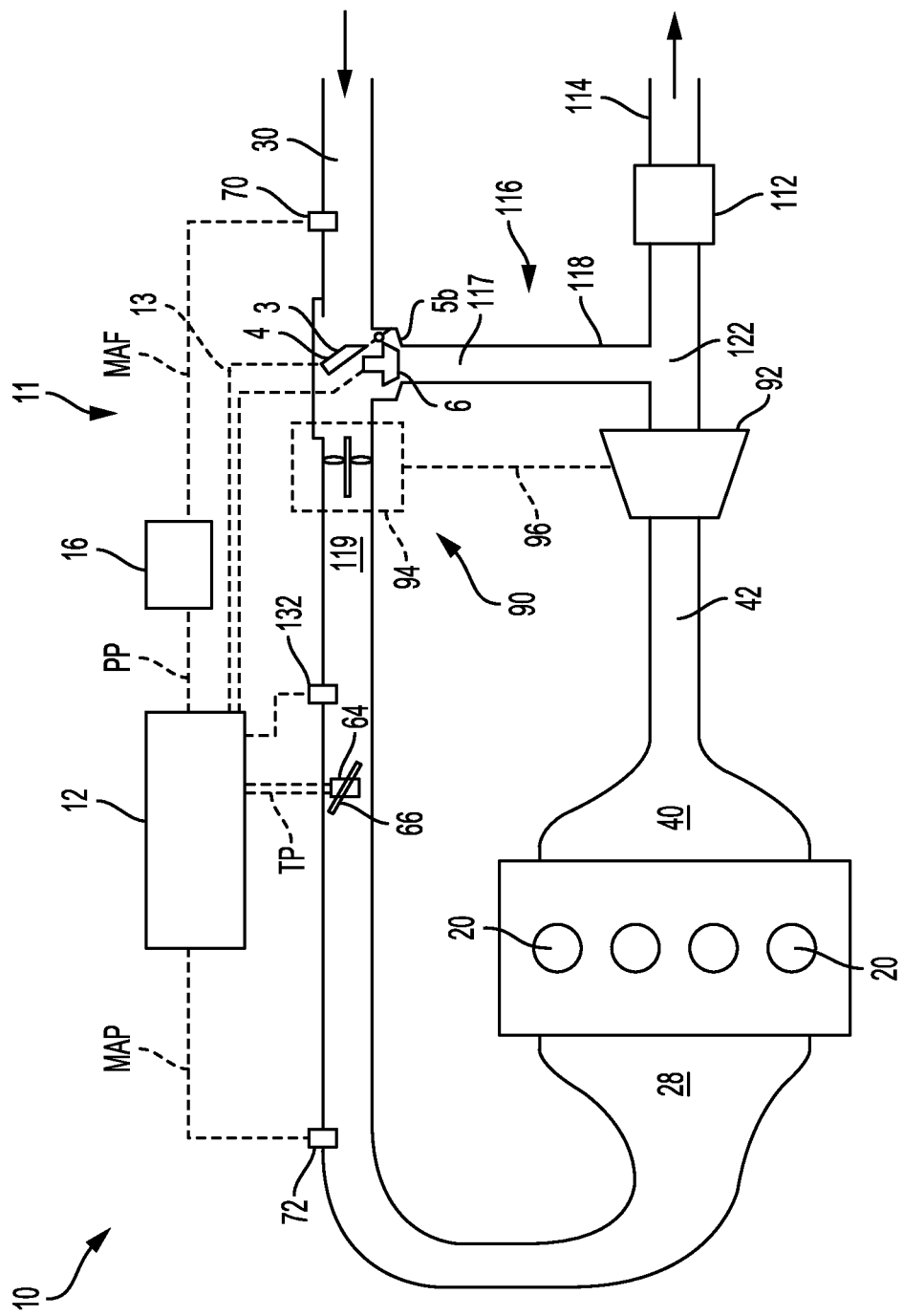
FIG. 1 shows a schematic diagram of an example engine system including a supercharger and an exhaust gas recirculation (EGR) system.

Turning now to FIG. 1, a schematic diagram of an engine, or engine system 10, which may be included in a propulsion system of an automobile, is shown. Engine 10 may be controlled at least partially by a control system including controller 12 and by input from a vehicle operator, for example a driver, via an input device 16 such as an accelerator pedal. The pedal may be coupled with a pedal position sensor (not shown) for generating a proportional pedal position signal PP, or the like.

Engine 10 may include a plurality of combustion chambers 20 (i.e., cylinders) which may be arranged in an inline 4 configuration, as illustrated. It should be understood, however, that engine 10 may include any number of cylinders in any configuration, e.g., V-6, I-6, V-12, opposed 4, etc.

Though not shown in FIG. 1, each combustion chamber 20 (i.e., cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber 20 may receive intake air from an intake manifold 28 via an air intake passage 30. Intake manifold 28 may be coupled to the combustion chambers via intake ports. Each respective intake port may supply air and/or fuel to the respective cylinder for combustion. Each combustion chamber may exhaust combustion gases via an exhaust port coupled thereto. Each respective exhaust port may direct exhaust combustion gases from a respective cylinder to an exhaust manifold 40, and/or exhaust passage 42.

Intake passage 30 may include a throttle 64 having a throttle plate 66. In this example, the position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided the combustion chambers 20. The position of throttle plate 66 may be provided to controller 12 by throttle position signal TP from a throttle position sensor (not shown). Intake passage 30 may include a mass air flow sensor 70 and a manifold air pressure sensor 72 for providing respective signals MAF and MAP to controller 12.

Engine 10 may include a supercharger 90 embodied by a suitable mechanism, for example, a turbocharger. Turbocharger may be include a turbine 92 and a compressor 94 coupled for power transmission on, for example, a common shaft. FIG. 1 illustrates a power transmission coupling 96 with a dashed line. Other means to power the supercharger are possible. The blades of turbine 92 may be caused to rotate about the common shaft as a portion of the exhaust gas stream discharged from engine 10 impinges upon the blades of the turbine 92. Compressor 94 may be coupled to turbine 92 such that compressor 94 may be actuated when the blades of turbine 92 are caused to rotate. When actuated, compressor 94 may then direct pressurized fresh gas to air intake manifold 28 where it may then be directed to engine 10. The rotational speed of the turbine 92 may be measured with an appropriate measuring mechanism. For example a speed sensor (not shown) may be coupled with shaft power transmission coupling 96. A signal indicative of the speed may be sent, for example, to the controller 12.

Exhaust gases exiting turbine 92 may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), selective catalytic reduction catalyst (SCR), and a diesel particulate filter (DPF). After passing through emission control device 112, exhaust gas may be directed to a tailpipe 114.

Engine 10 may include an exhaust gas recirculation (EGR) system 116. EGR system 116 may deliver a portion of exhaust gas exiting engine 10 into the engine air intake passage 30. The EGR system includes an EGR conduit 118 coupled to an exhaust passage 122, downstream of the turbine 92, and to the air intake passage 30. The EGR conduit 118 may include an EGR valve 6 configured to control an amount of recirculated exhaust gas. As shown in FIG. 1, EGR system 116 is a low pressure EGR system, routing exhaust gas from downstream of the turbine 92 to upstream of the compressor 94. In another example, a high pressure EGR system may be used in addition to or in place of the low pressure EGR system (not shown). For example, the high pressure EGR system may route exhaust gas from upstream of the turbine 92, to the intake passage 30, downstream of the compressor 94.

Under some conditions, EGR system 116 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a conventional microcomputer including: a microprocessor unit, input/output ports, read-only memory, random access memory, keep alive memory, and a conventional data bus. Controller 12 may receive various signals from sensors coupled to engine 10, in addition to those signals previously discussed, including, for example: (not shown) engine coolant temperature (ECT) from a temperature sensor; an engine position sensor, e.g., a Hall effect sensor sensing crankshaft position. Barometric pressure may also be sensed for processing by controller 12. In some examples, an engine position sensor may produce a predetermined number of equally spaced pulses every revolution of the crankshaft from which engine speed (RPM) can be determined. Additionally, various sensors may be employed to determine turbocharger boost pressure. For example, a pressure sensor 132 may be disposed in intake 30 downstream of compressor 94 to determine boost pressure.

In some examples, the EGR valve 6 may be operatively coupled with the controller 12. The controller 12 may be configured for controlling positioning of the EGR valve 6 through each of the selected, and or predetermined positions or ranges. Various embodiments may include a flap 3 located at a junction, or at or near a junction point 5b, of the EGR conduit 118 and the intake passage 30. The flap 3 may be controllable by, and/or its position determined by the controller 12 via a connection 13.

Figure 2:
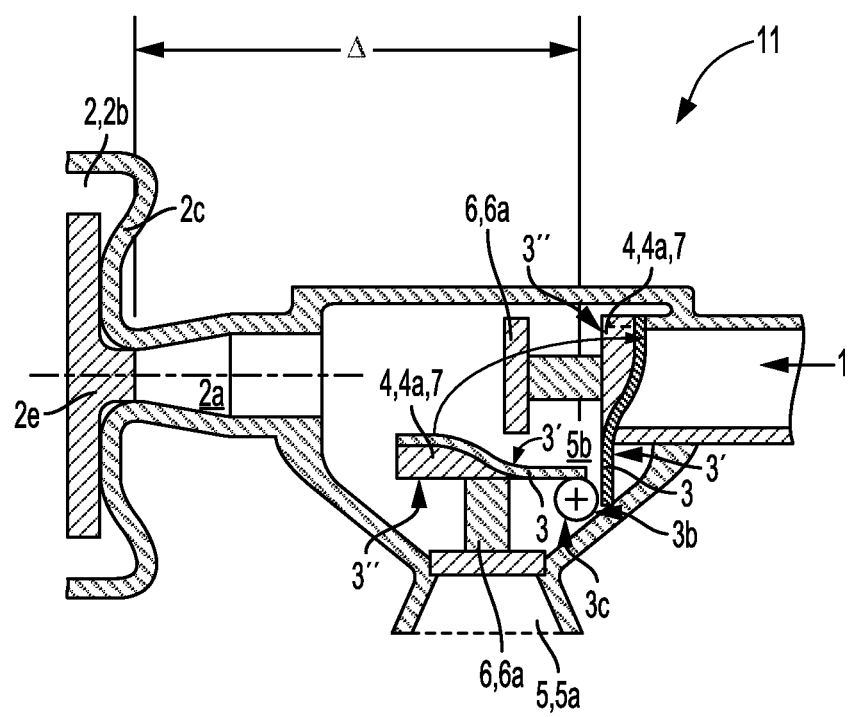
FIG. 2 schematically shows the compressor, arranged in the intake system, of a first embodiment of the internal combustion engine together with exhaust-gas recirculation arrangement, partially in section, and FIG. 3 schematically shows the compressor as per FIG. 2 in a perspective illustration in a view directed toward the impeller, partially in section.

FIG. 2 schematically shows the compressor 2, arranged in the intake system 1, of a first embodiment of the internal combustion engine together with exhaust-gas recirculation arrangement 5, partially in section.

For the supply of the charge air to the cylinders, the internal combustion engine has an intake system 1, and for the supercharging of the cylinders, an exhaust-gas turbocharger is provided which comprises a turbine (not illustrated) arranged in the exhaust-gas discharge system and a compressor 2 arranged in the intake system 1. The compressor 2 is a radial compressor 2b, in the housing 2c of which an impeller 2e is mounted on a rotatable shaft. The shaft of the impeller 2e lies in the plane of the drawing of FIG. 2 and runs horizontally.

The compressor 2 of the exhaust-gas turbocharger has an inlet region 2a which runs, and is formed, coaxially with respect to the shaft of the compressor 2, such that the section of the intake system 1 upstream of the compressor 2 does not exhibit any changes in direction, and the flow of charge air approaching the compressor 2 of the exhaust-gas turbocharger, or the impeller 2e thereof, runs substantially axially.

The internal combustion engine is furthermore equipped with an exhaust-gas recirculation arrangement 5 which comprises a recirculation line 5a which branches off from the exhaust-gas discharge system upstream of the turbine and which opens into the intake system 1, so as to form a junction point 5b, upstream of the compressor 2 and the compressor impeller 2e. The junction point 5b is, in the present case, arranged close to the compressor 2 with the formation of a small spacing Δ, whereby condensate formation is counteracted.

For the setting of the recirculated exhaust-gas flow rate, use is made of an EGR valve 6 which is fitted in the recirculation line 5a, that is to say is arranged at the junction point 5b, and which comprises an axially displaceable valve body 6a which is connected to a pivotable flap 3 and which is thereby mechanically coupled to the flap 3.

The flap 3 which is arranged in the intake system 1 at the junction point 5b is circumferentially delimited by an edge 3a, wherein the mounting 3c of the flap 3 in the intake system 1 is realized using a pivot axis 3b. The axis 3b, which runs transversely with respect to the fresh-air flow and about which the flap 3 is pivotable, is perpendicular to the plane of the drawing. In the present case, the axis 3b is arranged close to an edge section of the flap 3 and close to a wall section of the intake system 1, such that the flap 3 is laterally mounted, similarly to a door.

FIG. 2 shows the flap 3 in two different pivoting positions. In a first end position, the flap 3, by way of its front side 3', blocks the intake system 1. In a second end position, the rear side 3" of the flap 3 covers the recirculation line 5a of the exhaust-gas recirculation arrangement 5, whereas the intake system 1 is opened up.

A pivoting movement of the flap 3 is linked to a displacement of the valve body 6a of the EGR valve 6, wherein the flap 3 serves only for the setting of the air flow rate supplied via the intake system 1, and not for the dosing of the recirculated exhaust-gas flow rate. The latter is performed by the EGR valve 6.

The flap 3 is not planar but has, on the front side 3', a deformation 4, that is to say an unevenness. Here, as a deformation 4, the flap 3 has a convex bulge 4a, which faces toward and opposes the fresh-air flow in the first end position of the flap 3. The bulge 4a encompasses an edge region of the flap 3 situated opposite the axis 3b.

Figure 3:
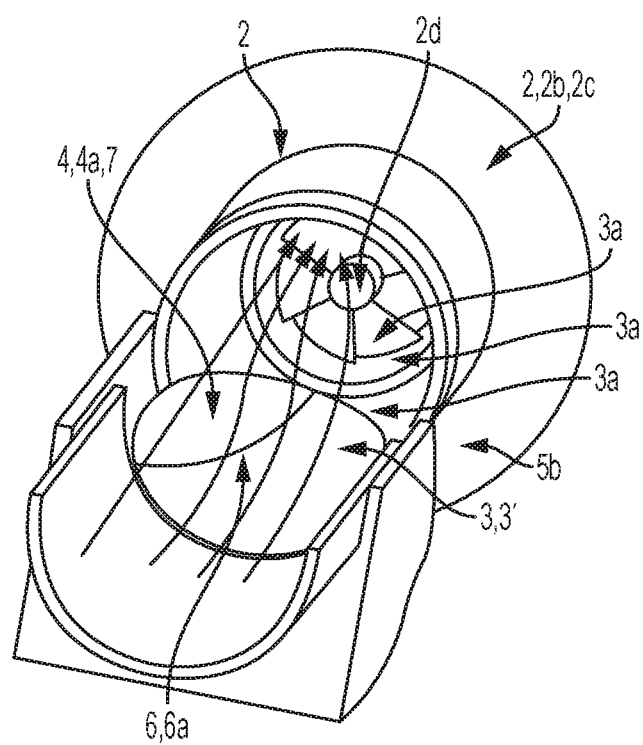

FIG. 3 schematically shows the compressor 2 as per FIG. 2 in a perspective illustration in a view directed toward the impeller 2e, partially in section. It is sought merely to explain the additional features in relation to FIG. 2, for which reason reference is made otherwise to FIG. 2. The same reference signs have been used for the same components.

As can be seen from FIG. 3, the bulge 4a provided on the front side 3' of the flap 3 encompasses an edge corner region 7 of the flap 3 at one side. In the present case, the bulge 4a is delimited on the left-hand edge corner region 7 of the flap 3, as denoted by the black shading. The corner 7 of the flap 3 is a rounded corner 7. For the introduction of a speed component transverse with respect to the shaft 2d of the impeller 2e, it is expedient for the flap 3 to be deformed only on one side, as is the case here.

Embodiments may provide a supercharger system 11, or engine system 10 (FIG. 1). The supercharger system 11, may include an intake 30 to receive intake air, and an exhaust gas recirculation (EGR) port 117 to receive exhaust gas from an engine 10, via an EGR conduit 118, and an outlet 119 to port the intake air and/or the exhaust gas to the engine. The system 11 may also include a flap 3 delimited circumferentially by an edge, and pivotable about an axis running transversely with respect to a flow of intake air. The flap 3 has a first position to block flow from the intake 30, and a second position to cover the EGR port 117 and open the intake. The flap 3 has a flow modification element 4 on one side thereof.

In some embodiments when in the first position, the flap 3 may allow flow from the EGR port. The system 11 may also include an EGR valve 6 to control flow from the EGR port. The flow modification element 4 may be one or more of: a kink, a bulge, a convex bulge, a concave bulge. The axis 3b may be arranged according to one or both of close to an edge section of the flap, and close to a wall section of the flap 3.

Various embodiments may provide method for supercharging charge air for an internal combustion engine. The method may include positioning a flap at a junction in an intake passage wherein an intake line is able to provide intake air from a first direction and an exhaust gas recirculation line is able to provide exhaust gas from a second direction; pivoting the flap about a pivot axis, the pivot axis oriented transverse to a flow direction of the intake air, from a first position wherein a first side of the flap blocks the intake passage, to a second position; and while in the second position, imparting a transverse flow component to the intake airflow with a flow modifying feature extending from the first side of the flap, while a second side of the flap at least partially covers the recirculation line.

The method may also include passing the intake air and/or the exhaust gas to a blower. The method may also include passing the intake air with a partial transverse flow to an impeller and directing the flow to a combustion chamber. The imparting a transverse flow includes positioning the flow modifying feature at an edge region of the flap. The imparting a transverse flow includes positioning a helically twisted form formed on the first side of the flap in a path of the intake air. The method may also include positioning the flap in a first position wherein the flap blocks the intake system and opens up the recirculation line. The pivoting the flap about the pivot axis includes pivoting the flap about a line close to an edge section of the flap.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and subcombinations of the various systems and configurations, and other features, functions, and/or properties disclosed herein.

The invention claimed is:

1. A supercharged internal combustion engine comprising:
   an intake system for supplying a charge-air flow;
   an exhaust-gas discharge system for discharging exhaust gas;
   at least one blower arranged in the intake system, which blower is equipped with at least one impeller which is mounted, in a housing, on a rotatable shaft;
   an exhaust-gas recirculation arrangement comprising a recirculation line which branches off from the exhaust-gas discharge system and which opens into the intake system upstream of the at least one impeller so as to form a junction point, the recirculation line branching off downstream of a turbine arranged in the exhaust-gas discharge system;
      wherein the junction point is formed and arranged in a vicinity of, at a distance $\Delta$ from, the at least one impeller;
      wherein $\Delta \leq 2.0\ D_v$, or $\Delta \leq 1.5\ D_v$; and
      wherein $D_v$ denotes a diameter of the at least one impeller; and
   a flap which is delimited circumferentially by an edge and which is arranged in the intake system at the junction point and which is pivotable about an axis running transversely with respect to a fresh-air flow, in such a way that the flap, in a first end position, by way of a front side, blocks the intake system and opens up the recirculation line, ands in a second end position, by way of a rear side, covers the recirculation line and opens up the intake system;
wherein the flap has at least one deformation as an unevenness;
wherein the at least one deformation extends into a supercharger intake section and engages the supercharger intake section when the flap is in the first end position, the at least one deformation outside of the supercharger intake section when the flap is in the second end position.

2. The supercharged internal combustion engine as claimed in claim 1,
wherein the axis is arranged close to an edge section of the flap;
wherein the axis is arranged close to a wall section of the intake system; and
wherein the at least one deformation of the flap comprises at least one bulge.

3. The supercharged internal combustion engine as claimed in claim 2, wherein the at least one bulge is convex.

4. The supercharged internal combustion engine as claimed in claim 2, wherein the at least one bulge is concave.

5. The supercharged internal combustion engine as claimed in claim 1, wherein the at least one deformation on the front side of the flap faces toward and opposes the charge-air flow at least in the first end position of the flap.

6. The supercharged internal combustion engine as claimed in claim 1, wherein the at least one deformation encompasses an edge region of the flap situated opposite the axis.

7. The supercharged internal combustion engine as claimed in claim 6, wherein the at least one deformation encompasses an edge corner region on one side of the flap.

8. The supercharged internal combustion engine as claimed in claim 7, wherein the at least one deformation of the flap in the edge corner region yields a bulged form.

9. The supercharged internal combustion engine as claimed in claim 1, wherein at least one exhaust-gas turbocharger is provided which comprises the turbine arranged in the exhaust-gas discharge system and a compressor arranged in the intake system, and wherein the at least one blower is the compressor of the at least one exhaust-gas turbocharger, wherein the at least one blower is a radial blower.

10. The supercharged internal combustion engine as claimed in claim 1, wherein the at least one blower has an inlet region which runs coaxially with respect to the shaft of the at least one impeller.

11. The supercharged internal combustion engine as claimed in claim 1, wherein the recirculation line is equipped with a valve which comprises an axially displaceable valve body which is connected, and thereby mechanically coupled, to the flap, a pivoting of the flap causing a displacement of the valve body.

12. The supercharged internal combustion engine as claimed in claim 1, wherein $\Delta \leq 0.75\ D_v$.

13. The supercharged internal combustion engine as claimed in claim 1,
wherein the at least one blower has an inlet region which runs, and is formed, coaxially with respect to the shaft of the at least one impeller; and
wherein the at least one deformation is positioned in the inlet region to forcibly impart an axial fresh-air flow speed component transverse with respect to the shaft of the at least one impeller.

14. A method for supercharging charge air for an internal combustion engine comprising:
positioning a flap at a junction in an intake passage wherein an intake line is able to provide intake aft from a first direction and an exhaust gas recirculation line is able to provide exhaust gas from a second direction;
wherein the flap has at least one deformation as an unevenness;
wherein the at least one deformation extends into a supercharger intake section and engages the supercharger intake section when the flap is in the first end position, the at least one deformation outside of the supercharger intake section when the flap is in the second end position;
wherein the junction is formed and arranged in a vicinity of, at a distance $\Delta$ from, the at least one impeller of a compressor;
wherein $\Delta \leq 2.0\ D_v$ or $\Delta \leq 1.5\ D_v$; and
wherein $D_v$ denotes a diameter of the at least one impeller;
pivoting the flap about a pivot axis, the pivot axis oriented transverse to a section of the intake passage upstream of the compressor, from a first position wherein a first side of the flap blocks the intake passage, to a second position; and
while in the second position, imparting a transverse flow component to an intake airflow with a flow modifying feature extending from the first side of the flap, while a second side of the flap at least partially covers the exhaust gas recirculation line.

15. The method of claim 14, further comprising passing at least one of the intake air and the exhaust gas to a blower.

16. The method of claim 14, further comprising passing the intake aft with a partial transverse flow to the at least one impeller and directing the flow to a combustion chamber.

17. The method of claim 14, wherein the imparting the partial transverse flow includes at least one of:
positioning the flow modifying feature at an edge region of the flap; and
positioning bulge formed on the first side of the flap in a path of the intake air.

18. The method of claim 14, further comprising positioning the flap in the first position wherein the flap blocks the intake passage and opens up the exhaust gas recirculation line and wherein the pivoting the flap about the pivot axis includes pivoting the flap about a line close to an edge section of the flap.

19. A supercharger system comprising:
a supercharger intake section to receive intake air;
an exhaust gas recirculation (EGR) port to receive exhaust gas from an engine;
a supercharger outlet to port at least one of the intake and the exhaust gas to the engine; and
a flap delimited circumferentially by an edge, and pivotable about an axis running transversely with respect to the supercharger intake section;
wherein the flap has a first position to block flow from the supercharger intake section, and a second position to cover the EGR port and open the supercharger intake section, the flap having a flow modification element on one &de thereof to add a transverse flow component to an intake flow at least when in the second position, the flow modification element extending into the supercharger intake section and engaging the supercharger intake section when the flap is in the first position, the flow modification element outside of the supercharger intake section when the flap is in the second position.

20. The system of claim 19, wherein when in the first position the flap allows flow from the EGR port, further comprising an EGR valve to control flow from the EGR port, a housing, and a supercharger compressor, the housing extending from the supercharger compressor to the supercharger intake section, the flap positioned between the supercharger compressor and the supercharger intake section.

21. The system of claim 19, wherein the flow modification element is a bulge.

22. The system of claim 19, wherein the axis is arranged according to one or both of close to an edge section of the flap, and close to a wall section of the flap.

* * * * *